(12) United States Patent
Lee et al.

(10) Patent No.: US 9,175,746 B2
(45) Date of Patent: Nov. 3, 2015

(54) POWER TRANSMITTING APPARATUS FOR VEHICLE

(71) Applicant: Hyundai Motor Company, Seoul (KR)

(72) Inventors: Sueng Ho Lee, Seoul (KR); Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 66 days.

(21) Appl. No.: 14/092,916

(22) Filed: Nov. 27, 2013

(65) Prior Publication Data

US 2014/0144266 A1    May 29, 2014

(30) Foreign Application Priority Data

Nov. 28, 2012  (KR) .................... 10-2012-0136463

(51) Int. Cl.
*F16H 3/093* (2006.01)
*F16H 3/00* (2006.01)

(52) U.S. Cl.
CPC ............. *F16H 3/093* (2013.01); *F16H 3/006* (2013.01); *F16H 2003/0931* (2013.01); *F16H 2200/0052* (2013.01); *Y10T 74/19233* (2015.01)

(58) Field of Classification Search
CPC ............. F16H 2061/0444; F16H 2061/0455; F16H 2061/0418; F16H 2061/0407; F16H 61/0403; B60W 10/113
USPC ................... 74/325, 330, 331; 701/51, 59, 61
See application file for complete search history.

(56) References Cited

U.S. PATENT DOCUMENTS

2011/0023638 A1    2/2011  Mohlin et al.
2013/0319142 A1*  12/2013  Kim .................................. 74/57

FOREIGN PATENT DOCUMENTS

| JP | 2004-239441 A | 8/2004 |
| KR | 10-1144363 B1 | 6/2012 |
| KR | 10-1181746 B1 | 9/2012 |

* cited by examiner

*Primary Examiner* — William Kelleher
*Assistant Examiner* — Thomas Magnuson
(74) *Attorney, Agent, or Firm* — McDermott Will & Emery LLP

(57) ABSTRACT

A power transmitting apparatus for a vehicle, includes a variable connecting device, an input device, a speed output device having first and second synchronizer modules, and a reverse speed device. An even-numbered highest speed gear is disposed at one of synchronizer modules related to even-numbered speeds among the synchronizer modules. An odd-numbered highest speed gear is disposed at one of synchronizer modules related to odd-numbered speeds among the synchronizer module.

8 Claims, 2 Drawing Sheets

FIG.2

| Shift step | CL1 | CL2 | SL1 | | | SL2 | | | SL3 | | | SL4 | | | Note |
|---|---|---|---|---|---|---|---|---|---|---|---|---|---|---|---|
| | | | D1 | N | D3 | D2 | N | RG | D4 | N | D6-1 | D5 | N | D6-2 | |
| R | | ● | ○ | | | | | ● | ○ | | | ○ | | | |
| 1ST | ● | | ● | | | ○ | | | ○ | | | ○ | | | |
| 2ST | | ● | ○ | | | ● | | | ○ | | | ○ | | | - |
| 3ST | ● | | | | ● | ○ | | | ○ | | | ○ | | | |
| 4ST | | ● | ○ | | | ○ | | | ● | | | ○ | | | |
| 5ST | ● | | ○ | | | ○ | | | ○ | | | ● | | | |
| 6ST | | ● | ○ | | | ○ | | | | | ● | ○ | | | Used in shift from 6th to odd-numbered speed or from odd-numbered speed to 6th |
| | ● | | ○ | | | ○ | | | ○ | | | | | ● | Used in shift from 6th to even-numbered speed or from even-numbered speed to 6th |
| | ● | ● | ○ | | | ○ | | | | | ● | | | ● | At normal 6th |

● : Operating position    ○ : Neutral position

POWER TRANSMITTING APPARATUS FOR VEHICLE

CROSS-REFERENCE TO RELATED APPLICATION

This application claims benefit of priority to Korean Patent Application No. 10-2012-0136463 filed in the Korean Intellectual Property Office on Nov. 28, 2012, the entire contents of which are incorporated herein by reference.

TECHNICAL FIELD

The present inventive concept relates to a double clutch power transmitting apparatus. More particularly, the present inventive concept relates to a power transmitting apparatus for a vehicle which improves mountability by minimizing a length of the power transmitting apparatus, enhances drivability and fuel economy by preventing distortion of step ratios, and further enhances drivability by enabling of skip shift from the highest shift step to a specific shift step.

BACKGROUND

Environmentally-friendly technique of vehicles is very important technique on which survival of future motor industry may be dependent. Vehicle makers are focusing on development of environmentally-friendly vehicles so as to meet environment and fuel consumption regulations.

Some examples of future vehicle techniques include an electric vehicle (EV) and a hybrid electric vehicle (HEV) that use electrical energy, and a double clutch transmission (DCT) that improves efficiency and convenience.

The DCT includes two clutch devices and a gear train applied to a manual transmission. The DCT selectively transmits torque input from a power source to two input shafts by using two clutches, changes a speed by using the gear train, and outputs the changed torque.

Such a DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency, and change and addition of components are very easy in the DCT. Therefore, the DCT can meet fuel consumption regulations, and multi-speeds efficiency may be improved.

The above information disclosed in this Background section is only for enhancement of understanding of the background of the inventive concept and may contain information that does not form the prior art that is already known.

SUMMARY

The present inventive concept has been made in an effort to provide a power transmitting apparatus for a vehicle having advantages of improving mountability by minimizing a length of the power transmitting apparatus, enhancing drivability and fuel economy by preventing distortion of step ratios, and further enhancing drivability by enabling of skip shift from the highest shift step to a specific shift step.

One aspect of the present inventive concept relates to a power transmitting apparatus for a vehicle, including a variable connecting device, an input device, a speed output device and a reverse speed device. The input device includes a first clutch and a second clutch and is configured to selectively output torque of a power source through the first clutch and the second clutch. The input device includes a first input shaft and a second input shaft. The first input shaft is selectively connected to the power source through the second clutch and has first, second, and sixth input gears fixedly disposed on an exterior circumference thereof. The second input shaft is selectively connected to the power source through the first clutch and has third, fourth, and fifth input gears fixedly disposed on an exterior circumference thereof. The speed output device includes a first output shaft disposed in parallel with the first and second input shafts, a first speed output unit disposed on the first output shaft and having first and second synchronizer modules, a second output shaft disposed in parallel with the first and second input shafts, and a second speed output unit disposed on the second output shaft and having third and fourth synchronizer modules. The reverse speed device includes a reverse speed shaft and an idle gear and a reverse input gear fixedly disposed on the reverse speed shaft. The idle gear is engaged with one input gear on the first and second input shafts and the reverse input gear is engaged with one synchronizer module disposed on the first output shaft. An even-numbered highest speed gear is disposed at one of synchronizer modules related to even-numbered speeds among the synchronizer modules. An odd-numbered highest speed gear is disposed at one of synchronizer modules related to odd-numbered speeds among the synchronizer modules.

The first input shaft may be a hollow shaft and the sixth, first and second input gears may be sequentially disposed on the exterior circumference of the first input shaft in this order from a front portion of the first input shaft to a rear portion thereof. At least a portion of the second input shaft may be disposed in the first input shaft, and the third, fifth and fourth input gears may be disposed on a portion of the second input shaft penetrating the first input shaft in a named sequence from a front portion of the second input shaft to a rear portion thereof.

The first synchronizer module may include a first speed gear and a third speed gear, and the second synchronizer module may include a second speed gear.

The third speed gear may be engaged with the third input gear and the first speed gear may be engaged with the fifth input gear.

The second synchronizer module may include a reverse speed gear engaged with the reverse input gear connected to the idle gear engaged with the sixth input gear through the reverse speed shaft, and a second speed gear engaged with the second input gear.

The third synchronizer module may include one sixth speed gear engaged with the first input gear and a fourth speed gear engaged with the second input gear.

The fourth synchronizer module may include another sixth speed gear engaged with the third input gear and a fifth speed gear engaged with the fourth input gear.

Another aspect of the present inventive concept encompasses a power transmitting apparatus for a vehicle including a first clutch, a second clutch, a first input shaft, a second input shaft, first and second output shafts, a first synchronizer module, a second synchronizer module, a third synchronizer module, and a fourth synchronizer module. The first clutch is connected to a power source and configured to selectively output torque of the power source. The second clutch is connected to the power source and configured to selectively output the torque of the power source. The first input shaft is a hollow shaft, configured to selectively receive the torque of the power source through the second clutch, and has sixth, first and second input gears sequentially disposed on an exterior circumference thereof in this order. The second input shaft penetrates the first input shaft without rotational interference therebetween, configured to selectively receive the torque of the power source through the first clutch, and has third, fifth and fourth input gears sequentially disposed on an exterior circumference thereof in this order. The first and second output shafts are disposed in parallel with the first and second input shafts. The first synchronizer module is disposed on the first output shaft and includes a third speed gear engaged with the third input gear and a first speed gear engaged with the fifth input gear. The second synchronizer module is disposed on the first output shaft, and includes a reverse speed gear engaged with a reverse input gear connected to an idle gear engaged with the sixth input gear through a reverse speed shaft and a second speed gear engaged with the second input gear. The third synchronizer module is disposed on the second output shaft, and includes one sixth speed gear engaged with the first input gear and a fourth speed gear engaged with the second input gear. The fourth synchronizer module is disposed on the second output shaft, and includes another sixth speed gear engaged with the third input gear and a fifth speed gear engaged with the fourth input gear.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

FIG. 2 is an operational chart of a power transmitting apparatus for a vehicle according to an exemplary embodiment of the present inventive concept.

<Description of symbols>

Figure 1:
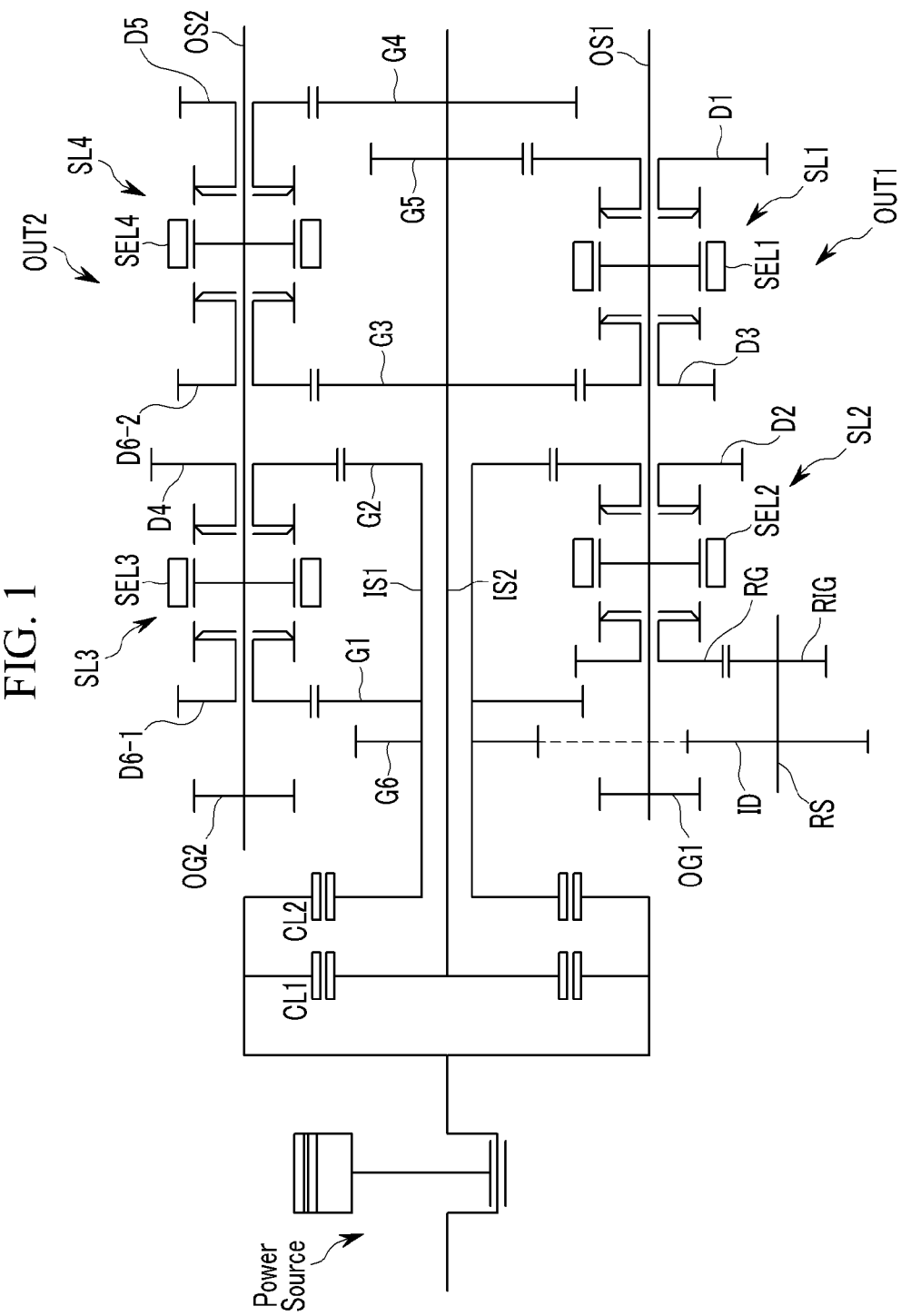
FIG. 1 is a schematic diagram of a power transmitting apparatus for a vehicle according to an exemplary embodiment of the present inventive concept.

| | |
|---|---|
| IS1: first input shaft | IS2: second input shaft |
| OS1: first output shaft | OS2: second output shaft |
| OG1: first output gear | OG2: second output gear |
| RS: reverse speed shaft | RG: reverse speed gear |
| RIG: reverse input gear | ID: idle gear |
| CL1, CL2: first and second clutches | |
| D1, D2, D3, D4, D5: first, second, third, fourth, and fifth speed gears | |
| D6-1, D6-2: sixth speed gears | |
| G1, G2, G3, G4, G5, G6: first, second, third, fourth, fifth, and sixth input gears | |
| SL1, SL2, SL3, SL4: first, second, third, and fourth synchronizer modules | |

DETAILED DESCRIPTION

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification. In the detailed description, ordinal numbers are used for distinguishing constituent elements having the same terms, and have no specific meanings.

An exemplary embodiment of the present inventive concept will hereinafter be described in detail with reference to the accompanying drawings.

FIG. 1 is a schematic diagram of a power transmitting apparatus for a vehicle according to an exemplary embodiment of the present inventive concept.

Referring to FIG. 1, a power transmitting apparatus according to an exemplary embodiment of the present inventive concept may include a variable connecting device, an input device, a speed output device, and a reverse speed device.

The variable connecting device may include a first clutch CL1 and a second clutch CL2. The input device may include a first input shaft IS1 and a second input shaft IS2. The speed output device may include first and second speed output units OUT1 and OUT2, and the reverse speed device may include a reverse speed shaft RS, and an idle gear ID and a reverse input gear RIG.

The first clutch CL1 and the second clutch CL2 may selectively transmit torque of a power source respectively to the second input shaft IS2 and the first input shaft IS1.

The first clutch CL1 may selectively connect the second input shaft IS2 with an output side of the power source, and the second clutch CL2 may selectively connect the first input shaft IS1 with the output side of the power source.

The first and second clutches CL1 and CL2 forming the variable connecting device may be multi-plate clutches of wet type, and may be controlled by a hydraulic control system (not shown).

The first input shaft IS1 may be a hollow shaft, and a front end portion of the first input shaft IS1 may be selectively connected to the output side of the power source through the second clutch CL2.

In addition, sixth, first and second input gears G6, G1, and G2 may be disposed in this order on the first input shaft IS1 with predetermined distances from a front portion of the first input shaft IS1 to a rear portion thereof.

The second input shaft IS2 may be inserted in the first input shaft IS1 without rotational interference with the first input shaft IS1. A front end portion of the second input shaft IS2 may be selectively connected to the output side of the power source through the first clutch CL1.

In addition, third, fourth, and fifth input gears G3, G4, and G5 may be disposed on the second input shaft IS2 with predetermined distances from a front portion of the second input shaft IS2. The third, fourth, and fifth input gears G3, G4, and G5 may be positioned at a rear portion of the second input shaft IS2 penetrating the first input shaft IS1 and may be disposed in the sequence of the third, fifth, and fourth input gears G3, G5, and G4 from the front portion of the second input shaft IS2 to the rear portion thereof.

The first, second, third, fourth, fifth, and sixth input gears G1, G2, G3, G4, G5, and G6 may be input gears operating at each speed. That is, the first input gear G1 may be operated at an even-numbered sixth forward speed, the second input gear G2 may be operated at a second forward speed and a fourth forward speed, the third input gear G3 may be operated at a third forward speed and an odd-numbered sixth forward speed, the fourth input gear G4 may be operated at a fifth forward speed, the fifth input gear G5 may be operated at a first forward speed, and the sixth input gear G6 may be operated at a reverse speed.

That is, the input gears for even-numbered speeds and the reverse speed, e.g., G1, G2 and G6, may be disposed on the first input shaft IS1, and the input gears for odd-numbered speeds, e.g., G3, G4 and G5, may be disposed on the second input shaft IS2.

The speed output device may be adapted to receive torque from each input gear of the input device, convert the torque, and output the converted torque. The speed output device may include the first and second speed output units OUT1 and OUT2 disposed in parallel with the first and second input shafts IS1 and IS2.

The first speed output unit OUT1 may include a first output shaft OS1 disposed in parallel with the first and second input shafts IS1 and IS2, a first synchronizer module SL1 including a first speed gear D1 and a third speed gear D3, and a second synchronizer module SL2 including a second speed gear D2 and a reverse speed gear RG.

The first synchronizer module SL1 may be disposed on a rear portion of the first output shaft OS1, and the second synchronizer module SL2 may be disposed on a front portion of the first output shaft OS1.

The first speed gear D1 of the first synchronizer module SL1 may be engaged with the fifth input gear G5, and the third speed gear D3 of the first synchronizer module SL1 may be engaged with the third input gear G3.

The second speed gear D2 of the second synchronizer module SL2 may be engaged with the second input gear G2.

In addition, the torque converted by the first speed output unit OUT1 may be transmitted to a differential device through a first output gear OG1 mounted at a front end portion of the first output shaft OS1.

The second speed output unit OUT2 may include a second output shaft OS2 disposed in parallel with the first and second input shafts IS1 and IS2, a third synchronizer module SL3 including one sixth speed gear D6-1 and a fourth speed gear D4, and a fourth synchronizer module SL4 including another sixth speed gear D6-2 and a fifth speed gear D5.

The third synchronizer module SL3 may be disposed on a front portion of the second output shaft OS2 and the fourth synchronizer module SL4 may be disposed on a rear portion of the second output shaft OS2.

The one sixth speed gear D6-1 of the third synchronizer module SL3 may be engaged with the first input gear G1, and the fourth speed gear D4 of the third synchronizer module SL3 may be engaged with the second input gear G2.

Another sixth speed gear D6-2 of the fourth synchronizer module SL4 may be engaged with the third input gear G3, and the fifth speed gear D5 of the fourth synchronizer module SL4 may be engaged with the fourth input gear G4.

In addition, the torque converted by the second speed output unit OUT2 may be transmitted to the differential device through the second output gear OG2 mounted at a front end portion of the second output shaft OS2.

Total gear ratio of the first input gear G1 and the one sixth speed gear D6-1 may be the same as total gear ratio of the third input gear G3 and the another sixth speed gear D6-2.

The reverse speed device may include the reverse speed shaft RS, and the idle gear ID and the reverse input gear RIG integrally formed with the reverse speed shaft RS.

The idle gear ID may be engaged with the sixth input gear G6, and the reverse input gear RIG may be engaged with the reverse speed gear RG. Therefore, if the first input shaft IS1 rotates, torque of the sixth input gear G6 may be transmitted to the reverse speed gear RG as an inverse rotation speed, and the inverse rotation speed may be transmitted to the conventional differential device through the first output shaft OS1.

Sleeves SLE1, SLE2, SLE3, and SLE4 applied respectively to the first, second, third, and fourth synchronizer modules SL1, SL2, SL3, and SL4, may be operated by additional actuators (not shown), and the actuators are controlled by a transmission control unit.

FIG. 2 is an operational chart of a power transmitting apparatus for a vehicle according to an exemplary embodiment of the present inventive concept.

[Reverse Speed]

At the reverse speed R, as shown in FIG. 2, the first output shaft OS1 and the reverse speed gear RG may be operably connected by the sleeve SLE2 of the second synchronizer module SL2. After that, the second clutch CL2 may be operated. Then, shift to the reverse speed may be completed.

[First Forward Speed]

At the first forward speed $1^{ST}$, as shown in FIG. 2, the first speed gear D1 and the first output shaft OS1 may be operably connected by the sleeve SLE1 of the first synchronizer module SL1. After that, the first clutch CL1 may be operated. Then, shift to the first forward speed may be completed.

[Second Forward Speed]

If vehicle speed increases at the first forward speed $1^{ST}$ and shift to the second forward speed $2^{ND}$ is necessary, as shown in FIG. 2, the second speed gear D2 and the first output shaft OS1 may be operably connected by the sleeve SLE2 of the second synchronizer module SL2. After that, the first clutch CL1 may be released and the second clutch CL2 is operated. Then, the shift to the second forward speed may be completed.

After the shift to the second forward speed is completed, the sleeve SLE1 of the first synchronizer module SL1 may be moved to a neutral position.

[Third Forward Speed]

If the vehicle speed increases at the second forward speed $2^{ND}$ and shift to the third forward speed $3^{RD}$ is necessary, as shown in FIG. 2, the third speed gear D3 and the first output shaft OS1 may be operably connected by the sleeve SLE1 of the first synchronizer module SL1. After that, the second clutch CL2 may be released and the first clutch CL1 may be operated. Then, the shift to the third forward speed may be completed.

After the shift to the third forward speed is completed, the sleeve SLE2 of the second synchronizer module SL2 may be moved to a neutral position.

[Fourth Forward Speed]

If the vehicle speed increases at the third forward speed $3^{RD}$ and shift to the fourth forward speed $4^{TH}$ is necessary, as shown in FIG. 2, the fourth speed gear D4 and the second output shaft OS2 may be operably connected by the sleeve SLE3 of the third synchronizer module SL3. After that, the first clutch CL1 is released and the second clutch CL2 may be operated. Then, the shift to the fourth forward speed may be completed.

After the shift to the fourth forward speed is completed, the sleeve SLE1 of the first synchronizer module SL1 may be moved to the neutral position.

[Fifth Forward Speed]

If the vehicle speed increases at the fourth forward speed $4^{TH}$ and shift to the fifth forward speed $5^{TH}$ is necessary, as shown in FIG. 2, the fifth speed gear D5 and the second output shaft OS2 are operably connected by the sleeve SLE4 of the fourth synchronizer module SL4. After that, the second clutch CL2 may be released and the first clutch CL1 may be operated. Then, the shift to the fifth forward speed may be completed.

After the shift to the fifth forward speed is completed, the sleeve SLE3 of the third synchronizer module SL3 may be moved to a neutral position.

[Sixth Forward Speed]

If the vehicle speed increases at the fifth forward speed $5^{TH}$ and shift to the sixth forward speed $6^{TH}$ is necessary, as shown in FIG. 2, the first clutch CL1 may be released, and the another sixth speed gear D6-2 and the one sixth speed gear D6-1 may be operably connected to the second output shaft OS2 by the sleeve SLE4 of the fourth synchronizer module SL4 and the sleeve SLE3 of the third synchronizer module SL3, respectively. After that, the first and second clutches CL1 and CL2 may be simultaneously operated. Then, the shift to the sixth forward speed may be completed.

That is, both of the one sixth speed gear D6-1 and another sixth speed gear D6-2 may be connected to the second output shaft OS2 at the normal sixth forward speed.

In addition, the power transmitting apparatus according to the exemplary embodiment of the present inventive concept can perform skip shift from the sixth forward speed to the first forward speed, the second forward speed, the third forward speed, or the fourth forward speed.

In further detail, if the skip shift from the sixth forward speed to the odd-numbered speed (the first forward speed or the third forward speed) is performed, a vehicle can run with the sixth forward speed by operating the second clutch CL2 in a state that the one sixth speed gear D6-1 and the second output shaft OS2 are connected.

In contrast, if the skip shift from the sixth forward speed to the even-numbered speed (the second forward speed or the fourth forward speed) is performed, the vehicle can run with the sixth forward speed by operating the first clutch CL1 in a state that the another sixth speed gear D6-2 and the second output shaft OS2 are connected.

That is, if the skip shift from the sixth forward speed to the odd-numbered speed or from the odd-numbered speed to the sixth forward speed is performed, the first speed gear D1 or the third speed gear D3 may be operably connected to the first output shaft OS1 through the first sleeve SLE1 in a state that the one sixth speed gear D6-1 and the second clutch CL2 are operated. After that, the second clutch CL2 may be released and the first clutch CL1 may be operated such that the skip shift to the first forward speed or the third forward speed is performed.

After the skip shift to the first forward speed or the third forward speed is completed, the third sleeve SLE3 connecting the one sixth speed gear D6-1 and the second output shaft OS2 may be moved to the neutral position.

In addition, if the skip shift from the sixth forward speed to the even-numbered speed or from the even-numbered speed to the sixth forward speed is performed, the second speed gear D2 may be operably connected to the first output shaft OS1 through the second sleeve SLE2 or the fourth speed gear D4 may be operably connected to the second output shaft OS2 through the third sleeve SLE3 in a state that another sixth speed gear D6-2 and the first clutch CL1 are operated. After that, the first clutch CL1 may be released and the second clutch CL2 may be operated such that the skip shift to the second forward speed or the fourth forward speed is performed.

After the skip shift to the second forward speed or the fourth forward speed is completed, the fourth sleeve SLE4 connecting another sixth speed gear D6-2 and the second output shaft OS2 may be moved to the neutral position.

The fourth speed gear D4 as well as another sixth speed gear D6-2 may be disposed on the second output shaft OS2 in the skip shift from the sixth forward speed to the fourth forward speed, but there is no problem for operably connecting the fourth speed gear D4 to the second output shaft OS2 because the second clutch CL2 is released.

In the power transmitting apparatus according to the exemplary embodiment of the present inventive concept, the second speed gear D2 and the fourth speed gear D4 may be simultaneously engaged to the second input gear G2, and the third speed gear D3 and another sixth speed gear D6-2 may be simultaneously engaged to the third input gear G3.

Since six forward speeds can be achieved but the number of input gears disposed on the input shafts can be minimized, it is unnecessary to elongate a length of the input shafts. Therefore, layout change of engine compartments and other design change due to increase of the length of the transmission may be prevented.

In addition, step ratios between shift steps may be large at a low-speed region where higher output is necessary but may be small at a high-speed region where quick shift and driving efficiency are necessary. The second speed gear D2 and the fourth speed gear D4 having comparatively large gear ratio difference therebetween may be simultaneously engaged to the second input gear G2, and the third speed gear D3 and another sixth speed gear D6-2 having comparatively large gear ratio difference therebetween may be simultaneously engaged to the third input gear G3 in an exemplary embodiment of the present inventive concept. Therefore, drivability and fuel economy may be improved by preventing distortion of step ratios at the high-speed region.

In addition, since two clutches CL1 and CL2 are operated at the sixth forward speed, drag torque of the clutches may not be generated. Therefore, fuel economy may be improved.

In addition, since the synchronizer modules for achieving the sixth forward speed that is the highest shift step are provided respectively on the odd-numbered speed side and the even-numbered speed side, skip shift can be performed. Therefore, drivability may be improved.

While exemplified in this specification, but the present inventive concept is not limited to the configuration that the synchronizer modules for achieving the highest shift step are provided respectively on the odd-numbered speed side and the even-numbered speed side.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A power transmitting apparatus for a vehicle, comprising:
    a variable connecting device including a first clutch and a second clutch and configured to selectively output torque of a power source through the first clutch and the second clutch;
    an input device including a first input shaft and a second input shaft, the first input shaft being selectively connected to the power source through the second clutch and having first, second, and sixth input gears fixedly disposed on an exterior circumference thereof, the second input shaft being selectively connected to the power source through the first clutch and having third, fourth, and fifth input gears fixedly disposed on an exterior circumference thereof;
    a speed output device including a first output shaft disposed in parallel with the first and second input shafts, a first speed output unit disposed on the first output shaft and having a first synchronizer module for achieving two speeds among first, third, fifth and sixth forward speeds and a second synchronizer module for achieving two speeds among second and fourth forward speeds, the sixth forward speed and a reverse speed, a second output shaft disposed in parallel with the first and second input shafts, and a second speed output unit disposed on the second output shaft and having a third synchronizer module for achieving the other two speeds among the second, fourth and sixth forward speeds and the reverse speed and a fourth synchronizer module for achieving the other two speeds among the first, third, fifth and sixth forward speeds; and a reverse speed device including a reverse speed shaft and an idle gear and a reverse input gear fixedly disposed on the reverse speed shaft, wherein the idle gear is engaged with one input gear on the first and second input shafts and the reverse input gear is engaged with the second synchronizer module disposed on the first output shaft, wherein one sixth speed gear for achieving the sixth forward speed is disposed at the third synchronizer module and another sixth speed gear for achieving the sixth forward speed is disposed at the fourth synchronizer module.

2. The power transmitting apparatus of claim 1, wherein the first input shaft is a hollow shaft and the sixth, first and second input gears are sequentially disposed on the exterior circumference of the first input shaft in this order from a front portion of the first input shaft to a rear portion thereof, and the second input shaft has a front portion which penetrates through the first input shaft and has a rear portion on which the third, fifth and fourth input gears are sequentially disposed.

3. The power transmitting apparatus of claim 2, wherein the first synchronizer module includes a first speed gear and a third speed gear, and the second synchronizer module includes a second speed gear.

4. The power transmitting apparatus of claim 3, wherein the third speed gear is engaged with the third input gear and the first speed gear is engaged with the fifth input gear.

5. The power transmitting apparatus of claim 3, wherein the second synchronizer module includes a reverse speed gear engaged with the reverse input gear connected to the idle gear engaged with the sixth input gear through the reverse speed shaft, and the second speed gear is engaged with the second input gear.

6. The power transmitting apparatus of claim 3, wherein the third synchronizer module includes the one sixth speed gear engaged with the first input gear and a fourth speed gear engaged with the second input gear.

7. The power transmitting apparatus of claim 3, wherein the fourth synchronizer module includes the other sixth speed gear engaged with the third input gear and a fifth speed gear engaged with the fourth input gear.

8. A power transmitting apparatus for a vehicle, comprising:

a first clutch connected to a power source and configured to selectively output torque of the power source;

a second clutch connected to the power source and configured to selectively output the torque of the power source;

a first input shaft being a hollow shaft, configured to selectively receive the torque of the power source through the second clutch, and having sixth, first and second input gears sequentially disposed in this order on an exterior circumference thereof;

a second input shaft penetrating the first input shaft without rotational interference therebetween, configured to selectively receive the torque of the power source through the first clutch, and having third, fifth and fourth input gears sequentially disposed in this order on an exterior circumference thereof;

first and second output shafts disposed in parallel with the first and second input shafts;

a first synchronizer module disposed on the first output shaft, and including a third speed gear for achieving a third forward speed engaged with the third input gear and a first speed gear for achieving a first forward speed engaged with the fifth input gear;

a second synchronizer module disposed on the first output shaft, and including a second speed gear for achieving a second forward speed engaged with the second input gear, and a reverse speed gear for achieving a reverse speed engaged with a reverse input gear connected to an idle gear engaged with the sixth input gear through a reverse speed shaft;

a third synchronizer module disposed on the second output shaft, and including one sixth speed gear for achieving a sixth forward speed engaged with the first input gear and a fourth speed gear for achieving a fourth forward speed engaged with the second input gear; and a fourth synchronizer module disposed on the second output shaft, and including another sixth speed gear for achieving the sixth forward speed engaged with the third input gear and a fifth speed gear for achieving a fifth forward speed engaged with the fourth input gear.

* * * * *